(12) United States Patent
Wang et al.

(10) Patent No.: US 7,329,715 B2
(45) Date of Patent: *Feb. 12, 2008

(54) ABRASION RESISTANT COATINGS BY SILOXANE OLIGOMERS

(75) Inventors: Hailiang Wang, Camarillo, CA (US); Zhibang Jim Duan, Newbury Park, CA (US); Satyabrata Raychaudhuri, Thousand Oaks, CA (US)

(73) Assignee: Yazaki Corporation, Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 11/108,175

(22) Filed: Apr. 18, 2005

(65) Prior Publication Data

US 2006/0235178 A1    Oct. 19, 2006

(51) Int. Cl.
*C08G 77/08*    (2006.01)

(52) U.S. Cl. .............. 528/19; 106/287.18; 106/287.15; 106/287.14; 106/287.13; 106/287.11; 427/387

(58) Field of Classification Search ................ 528/19; 106/287.18, 287.15, 287.14, 287.13, 287.11; 427/387

See application file for complete search history.

(56) References Cited

U.S. PATENT DOCUMENTS

| | | | |
|---|---|---|---|
| 3,971,747 A * | 7/1976 | Bank et al. ................. | 523/435 |
| 4,069,368 A * | 1/1978 | Deyak et al. ............... | 428/447 |
| 5,605,997 A | 2/1997 | Yamamoto et al. | |
| 5,650,474 A | 7/1997 | Yamaya et al. | |
| 6,043,330 A * | 3/2000 | Hacker et al. .............. | 528/12 |
| 6,069,259 A | 5/2000 | Crivello | |
| 6,335,380 B1 | 1/2002 | Wilhelm et al. | |
| 6,391,999 B1 | 5/2002 | Crivello | |
| 6,871,418 B2 | 6/2005 | Raychaudhuri et al. | |
| 2002/0123592 A1* | 9/2002 | Zhang et al. ................. | 528/10 |
| 2002/0137870 A1 | 9/2002 | Crivello | |
| 2002/0160316 A1 | 10/2002 | Richter et al. | |
| 2003/0189264 A1 | 10/2003 | Jones et al. | |

FOREIGN PATENT DOCUMENTS

EP    0505737    9/1992

OTHER PUBLICATIONS

Arkles et al., "High Density Silicon Dioxide Coatings by UV and Thermal Processing," 2000, Silicones in Coatings III, Barcelona, Spain.
Arkles, "Commercial Applications of Sol-Gel-Derived Hybrid Materials," MRS Bulletin, 2001, pp. 402-408.
Arkles, "Silicon Esters," Encyclopedia of Chemical Technology, 1997, Fourth Edition, 22:69-81.
Baney et al., "Silsesquioxanes," Chem. Rev., 1995, 95:1409-1430.

* cited by examiner

*Primary Examiner*—Margaret G. Moore
(74) *Attorney, Agent, or Firm*—Fish & Richardson P.C.

(57) ABSTRACT

A process including forming a siloxane oligomer from a mixture including at least one alkoxysilane, at least one phase transfer catalyst, and water, and adding at least one latent curing catalyst to the siloxane oligomer to form a coating composition is described. Also described is a process for producing a rapidly cured abrasion resistant coating, including providing a coating composition including a siloxane oligomer and a thermal latent curing catalyst, applying the coating composition to an article, and curing the coating composition for less than about 10 minutes to form a coating that has a Bayer ratio of abrasion resistance of at least about 2.0.

A coating composition including at least one siloxane oligomer, at least one phase transfer catalyst, and at least one latent curing catalyst is also described.

49 Claims, No Drawings

ABRASION RESISTANT COATINGS BY SILOXANE OLIGOMERS

TECHNICAL FIELD

This invention relates to abrasion resistant coatings, and more particularly to abrasion resistant coatings including a siloxane oligomer.

BACKGROUND

Siloxane oligomers can be used for many purposes, including abrasion resistant coatings, antistatic coatings, hydrophobic coatings, non-stick release coatings, corrosion resistant coatings, optical coatings such as optical fiber coatings and anti-reflective coatings, optical waveguides, adhesives, composites, oils, encapsulants for semiconductors, and coupling agents to promote adhesion between organic and inorganic surfaces.

Siloxane oligomers have been prepared by hydrolysis of silicon alkoxides, resulting in the formation of silanol monomers. Condensation and polymerization reactions of silanol monomers yield the siloxane oligomers. The hydrolysis and condensation reactions are accelerated by acid catalysts such as HCl, $H_2SO_4$, HF or by base catalysts such as $NH_3$ or NaOH. In the absence of such catalysts, these reactions proceed very slowly. In addition, the functionality of the resulting oligomers may be impaired, as these catalysts can react with and degrade the functionality of the siloxane oligomers, as well as other functional groups present, during synthesis reactions.

Coatings that include siloxane oligomers may be deposited on articles including cover plates of display devices such as field emission displays, liquid crystal displays (LCDs), plasma display panels (PDPs), electroluminescence displays (ELDs), cathode ray tube displays (CRTs), fluorescence tube displays, meters, clocks, and the like. Such coatings may also be used in the manufacture of televisions, personal digital assistants (PDAs), cellular phones, vehicle dashboards, projection screens, hand-held games and the like. These coatings may also be deposited on optical articles such as eyeglasses, lenses, prisms, optical windows, photomask substrates, pellicles used in photomask assemblies, and the like. Such coatings may also be deposited on other articles where the properties of siloxane oligomers are beneficial to the article, or for use of the article.

Siloxane oligomers can be used in various coating compositions. Such coatings may provide abrasion resistant, antistatic, and/or hydrophobic properties when deposited on transparent or non-transparent articles. The coatings may be deposited using various methods.

SUMMARY

In one aspect, a process including forming a siloxane oligomer from a mixture comprising at least one alkoxysilane, at least one phase transfer catalyst, and water, and adding at least one latent curing catalyst to the siloxane oligomer to form a coating composition is featured.

In another aspect, a coating composition, including at least one siloxane oligomer, at least one phase transfer catalyst, and at least one latent curing catalyst is described.

In another aspect, a process for producing a rapidly cured abrasion resistant coating, including providing a coating composition comprising a siloxane oligomer and a thermal latent curing catalyst, applying the coating composition to an article, and curing the coating composition to form a coating is described. The coating composition is cured for less than about 10 minutes. The coating has a Bayer ratio of abrasion resistance of at least about 2.0.

Implementations may include one or more of the following features. The alkoxysilane may have a general structure represented by formula (I):

where x equals 0, 1, 2 or 3, OR is a hydrolyzable alkoxy group, R is an alkyl group, and OFG is an organofunctional group.

Each R may independently have from 1 to 20 carbon atoms. Or, each R may independently have from 1 to 4 carbon atoms.

Each OFG may independently have from 1 to 100 carbon atoms. Or, each OFG may independently have from 1 to 20 carbon atoms. Each OFG may independently include at least one functional group selected from the group consisting of epoxy, acrylate, methacrylate, amino, acetyl, cyano, halogen, mercapto, vinyl, alkoxyalkyl, carbamate, carboxyl, ester, aromatic, or alkyl (straight, branched, or cyclic) functional groups. Each OFG may have at least one carbon atom in addition to the at least one functional group.

The alkoxysilane may be selected from the group consisting of (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane, tetraethoxysilane, tetramethoxysilane, 3-aminopropyltrimethoxysilane, 3-aminopropyltriethoxysilane, acetoxypropyltrimethoxysilane, 3-cyanopropyltrimethoxysilane, (3,3,3-trifluoropropyl)trimethoxysilane, (tridecafluoro-1,1,2,2-tetrahydrooctyl)triethoxysilane, 3-mercaptopropyltrimethoxysilane, vinyltrimethoxysilane, vinyltriethoxysilane, and mixtures thereof.

The alkoxysilane may be selected from the group consisting of (3-glycidoxypropyl)trimethoxysilane, 2-(3,4-epoxycyclohexyl)ethyltriethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane and mixtures thereof. Or, the alkoxysilane may be selected from the group consisting of (3-glycidoxypropyl)trimethoxysilane, (3-methacryloxypropyl)trimethoxysilane, (3-methacryloxypropyl)triethoxysilane, and mixtures thereof.

The phase transfer catalyst may have a general structure represented by formula II.

where M is phosphorus or nitrogen, $R^4$, $R^5$, $R^6$, and $R^7$ are alkyl or aromatic groups, and $A^-$ is a counter ion.

In various embodiments, when M is nitrogen, $A^-$ may not contain fluorine. $A^-$ may not contain fluorine. $A^-$ may be $Cl^-$, $Br^-$, $OH^-$, $NO_3^-$, $COO^-$, $SO_4^{2-}$, $HSO_4^-$, $BF_4^-$, or $PF_6^-$.

Groups $R^4$, $R^5$, $R^6$, and $R^7$ may independently have from 1 to 10 carbon atoms, and are independently straight, branched, cyclic alkyl groups or aromatic groups.

The phase transfer catalyst may be selected from the group consisting of tricaprylylmethylammonium chloride, methyl tributyl ammonium chloride, tetrabutyl ammonium bromide, tetrabutyl ammonium hydrogen sulfate, triethyl benzyl ammonium chloride, tetrabutyl phosphonium bromide, tetrabutyl phosphonium chloride, tetraoctylphosphonium bromide, and mixtures thereof. The phase transfer catalyst may be selected from the group consisting of tricaprylylmethylammonium chloride, tetrabutyl phosphonium bromide, tetrabutyl phosphonium chloride, tetraoctylphosphonium bromide, and mixtures thereof.

The phase transfer catalyst may be present in the mixture in an amount from about 0.0005 grams per gram of the alkoxysilane to 0.2 grams per gram of the alkoxysilane, or may be present in an amount from about 0.001 grams per mole of the alkoxysilane to 0.2 grams per gram of the alkoxysilane.

Water may be present in the mixture in an amount from about 0.5 moles per mole of the alkoxysilane to 20 moles per mole of the alkoxysilane, or from about 0.5 moles per mole of the alkoxysilane to 5 moles per mole of the alkoxysilane.

The mixture may include a solvent. The solvent may be selected from the group consisting of ethanol, isopropanol, 1-methoxy-2-propanol, ethyl acetate, n-butylacetate, t-butylacetate, 2-propoxyethanol, propylene glycol monomethyl ether acetate, and mixtures thereof. The solvent may comprise isopropanol. The solvent may be present in the mixture in an amount at least about 0.01 moles per mole of the alkoxysilane, at least about 0.1 moles per mole of the alkoxysilane, or at least about 1 mole per mole of the alkoxysilane.

Forming a siloxane oligomer may continue for a period sufficient to hydrolyze at least 40 percent of all OR groups, at least 70 percent of all OR groups, or at least 80 percent of all OR groups. Forming a siloxane oligomer may continue for a period sufficient to form a siloxane oligomer with a weight average molecular weight from about 500 to about 100,000, from about 1,000 to about 50,000, or from about 2,000 to about 20,000.

The latent curing catalyst may include a UV latent curing catalyst. The latent curing catalyst may include a thermal latent curing catalyst. The latent curing catalyst may include boron trifluoride complex with amine, or may include ammonium antimonite. The latent curing catalyst ratio may be from about 0.1 to about 5.0, or from about 1.0 to about 3.0.

The coating composition may include a solvent. The coating composition solvent may be selected from the group consisting of ethanol, isopropanol, 1-methoxy-2-propanol, ethyl acetate, n-butylacetate, t-butylacetate, 2-propoxyethanol, propylene glycol monomethyl ether acetate, and mixtures thereof.

The coating composition may include metal oxide particles. The metal oxide particles may be selected from the group consisting of particles of silica, zirconium oxide, zinc oxide, titanium oxide, aluminum oxide, cerium oxide, tin oxide, yttrium oxide, antimony pentoxide, silica-titania, indium tin oxide, antimony tin oxide, and mixtures thereof. The metal oxide particles may have functional groups on their surfaces.

The coating composition may have a particle ratio from about 0.1 to about 200, from about 20 to about 100, or from about 30 to about 70. The coating composition may have a solid content from about 20% to about 60%, or from about 30% to about 50%. The coating composition may have a viscosity from about 1 centipoise to about 150 centipoises, from about 2 centipoises to about 30 centipoises, or from about 3 centipoises to about 10 centipoises.

The process may also include applying the coating composition to an article to form a coated article. The process may also include preparing the surface of the article prior to applying the coating composition. Preparing the surface may include applying a primer layer to the surface of the article.

The process may also include purifying the formed siloxane oligomer before forming the coating composition. Purifying the formed siloxane oligomer may include separating a first liquid phase from a second liquid phase. The latent curing catalyst may be added to the siloxane oligomer without separating the phase transfer catalyst from the siloxane oligomer. Or, it may be added after separating the phase transfer catalyst from the siloxane oligomer.

When curing, in some implementations, the coating composition may be cured for less than about 5 minutes.

The details of one or more embodiments of the invention are set forth in the accompanying drawings and the description below. Other features, objects, and advantages of the invention will be apparent from the description and drawings, and from the claims.

DETAILED DESCRIPTION

Coating compositions comprising siloxane oligomers, deposition of these compositions on articles, and curing of these compositions to obtain coatings that have abrasion resistant, antistatic, and/or hydrophobic properties are described. In particular, compositions comprising siloxane oligomers prepared by phase transfer catalysts, and coatings obtained from such compositions, are described.

In one embodiment, the coating compositions comprise at least one siloxane oligomer prepared using at least one phase transfer catalyst. Optionally, one or more curing catalysts may be added to the coating composition to accelerate the rate of conversion of the siloxane oligomers into highly cross-linked solid abrasion resistant coatings. Optionally, one or more solvents may be added to the coating composition to adjust its viscosity and/or to aid the miscibility of the curing catalyst with the siloxane oligomer.

The preparation of siloxane oligomers by phase transfer catalysts suitable for the coating compositions described herein may be prepared by various processes. Siloxane oligomers may be prepared by forming a siloxane oligomer from a mixture including at least one alkoxysilane having at least one hydrolyzable group, water, and at least one phase transfer catalyst. Optionally, a solvent may be added to the mixture.

One reaction component is an alkoxysilane. An alkoxysilane that is suitable for the preparation of the siloxane oligomers has general formula I:

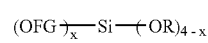

wherein x equals 0, 1, 2 or 3;
OR is a hydrolyzable alkoxy group;
R is an alkyl; and
OFG is an organofunctional group.

In some embodiments, each OFG independently includes at least one functional group selected from the group consisting of epoxy, acrylate, methacrylate, amino, acetyl, cyano, halogen, mercapto, vinyl, alkoxyalkyl, carbamate, carboxyl, ester, aromatic, or alkyl (straight, branched, or cyclic) functional groups. In one embodiment, each OFG independently has from 1 to 100 carbon atoms. In another embodiment, each OFG independently has from 1 to 20 carbon atoms. Each OFG may have at least one carbon atom in addition to the functional group.

In some embodiments, each alkyl group R independently has from 1 to 20 carbon atoms. In other embodiments, each alkyl group R independently has from 1 to 4 carbon atoms.

OFG groups such as epoxy, acrylate, methacrylate, and vinyl groups provide additional polymerizable functionality to the siloxane oligomers. In the presence of a suitable catalyst and thermal or actinic radiation, the siloxane oligomers with such polymerizable groups can polymerize to yield very hard abrasion resistant coatings. Organic groups with fluorine and alkyl functionalities can provide hydrophobic non-adhesive properties to the siloxane oligomers or polymers. Siloxane oligomers or polymers with various organofunctional groups such as amino, mercapto, and cyano groups can be used as coupling agents for adhesion of non-organic articles with organic articles as described by Edwin Plueddemann in "Silane Coupling Agents, 2 Edition", published by Plenum Press in New York, 1991.

Examples of suitable alkoxysilanes with epoxy functionalities include (3-glycidoxypropyl)trimethoxysilane, (3-glycidoxypropyl)dimethylmethoxysilane, (3-glycidoxypropyl)dimethylethoxysilane, (3-glycidoxypropyl)methyldiethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, mixtures thereof, and the like.

Examples of suitable alkoxysilanes with acrylate or methacrylate functionalities include (3-methacryloxypropyl)trimethoxysilane, (3-methacryloxypropyl)triethoxysilane, (3-acryloxypropyl)trimethoxysilane, (3-acryloxypropyl)methlyldimethoxysilane, (3-acryloxypropyl)dimethylmethoxysilane, (methacryloxymethyl)dimethylethoxysilane, methacryloxymethyltrimethoxysilane, methacryloxymethyltriethoxysilane, mixtures thereof, and the like.

Examples of suitable alkoxysilanes with amino functional groups include 3-aminopropyltrimethoxysilane, 3-aminopropyltriethoxysilane, 3-aminopropyldimethylethoxysilane, 3-aminopropylmethyldiethoxysilane, 3-aminopropyltris(methoxyethoxyethoxy)silane, 4-aminobutyltriethoxysilane, N-methylaminopropylmethyldimethoxysilane, N-methylaminopropyltrimethoxysilane, 3-(N-allylamino)propyltrimethoxysilane, N-(2-aminoethyl)-3-aminopropyltrimethoxysilane, (N,N-diethyl-3-aminopropyl)trimethoxysilane, N-(6-aminohexyl)aminopropyltrimethoxysilane, 3-(m-aminophenoxy)propyltrimethoxysilane, aminophenyltrimethoxysilane, m-aminophenyltrimethoxysilane, p-aminophenyltrimethoxysilane, 4-2(2-aminoethylaminomethyl)phenethyltrimethoxysilane, (aminoethylaminomethyl)phenethyltrimethoxysilane, mixtures thereof, and the like.

Examples of suitable alkoxysilanes with acetyl functional groups include acetoxymethyltriethoxysilane, acetoxymethyltrimethoxysilane, acetoxypropyltrimethoxysilane, mixtures thereof, and the like.

Examples of suitable alkoxysilanes with cyano functional groups include 2-cyanoethyltrimethoxysilane, 2-cyanoethyltriethoxysilane, 3-cyanopropyltrimethoxysilane, 3-cyanopropylmethyldimethoxysilane, 3-isocyanopropyltrimethoxysilane, 3-cyanopropyltrimethoxysilane, 3-cyanopropyltriethoxysilane, bis(3-cyanopropyl)dimethoxysilane, mixtures thereof, and the like.

Examples of suitable alkoxysilanes with halogen functional groups include 3-bromopropyltrimethoxysilane, 3-chloropropyltrimethoxysilane, 3-chloroethyltrimethoxysilane, 2-chloroethyltriethoxysilane, 3-chloropropyltriethoxysilane, chloromethyltriethoxysilane, chloromethyltrimethoxysilane, 2-(4-chlorosulfonylphenyl)ethyltrimethoxysilane, (3,3,3-trifluoropropyl)trimethoxysilane, (tridecafluoro-1,1,2,2-tetrahydrooctyl)triethoxysilane, (heptadecafluoro-1,1,2,2-tetrahydrododecyl)triethoxysilane, pentafluorophenylpropyltrimethoxysilane, 11-bromoundecyltrimethoxysilane, chloromethylmethyldiethoxysilane, chloromethylmethyldiisopropoxysilane, ((chloromethyl)phenylethyl)-trimethoxysilane, p-chloromethylphenyltrimethoxysilane, p-chloromethylphenyltriisopropylsilane, 3-iodopropyltrimethoxysilane, mixtures thereof, and the like.

Examples of suitable alkoxysilanes with mercapto functional groups include 3-mercaptopropyltrimethoxysilane, 3-mercaptopropyltriethoxysilane, 3-mercaptomethylmethyldiethoxysilane, 3-mercaptopropylmethyldimethoxysilane, mercaptomethylmethyldiethoxysilane, mixtures thereof, and the like.

Examples of suitable alkoxysilanes with vinyl functional groups include butenyltriethoxysilane, vinyltrimethoxysilane, vinyltriethoxysilane, vinyltriisopropoxysilane, allyldimethoxysilane, allyltrimethoxysilane, allyltriethoxysilane, [2-(3-cyclohexenyl)ethyl]trimethoxysilane, [2-(3-cyclohexenyl)ethyl]triethoxysilane, 3-(N-allylamino)propyltrimethoxysilane, 2-(chloromethyl)allyltrimethoxysilane, 5-(bicycloheptenyl)triethoxysilane, mixtures thereof, and the like.

Examples of suitable alkoxysilanes with aromatic functional groups include phenethyltrimethoxysilane, phenyltrimethoxysilane, benzyltriethoxysilane, phenyltriethoxysilane, mixtures thereof, and the like.

Examples of suitable alkoxysilanes with alkyl functional groups include methyltrimethoxysilane, ethyltrimethoxysilane, propyltrimethoxysilane, butyltrimethoxysilane, isobutyltrimethoxysilane, n-butyltrimethoxysilane, hexyltrimethoxysilane, hexadecyltrimethoxysilane, octyltrimethoxysilane, isoctyltrimethoxysilane, decyltrimethoxysilane, allyltrimethoxysilane, cyclohexyltrimethoxysilane, cyclohexylmethyltrimethoxysilane, 2-(3-cyclohexenyl)ethyltrimethoxysilane, cyclopentyltrimethoxysilane, methyltriethoxysilane, ethyltriethoxysilane, propyltriethoxysilane, butyltriethoxysilane, isobutyltriethoxysilane, hexyltriethoxysilane, pentyltriethoxysilane, octyltriethoxysilane, cyclohexyltriethoxysilane, n-decyltriethoxysilane, dodecyltriethoxysilane, cyclohexylmethyltriethoxysilane, dimethyldimethoxysilane, diethyldiethoxysilane, mixtures thereof, and the like.

Examples of suitable alkoxysilanes with alkoxyalkyl functional groups include 3-methoxypropyltrimethoxysilane, 3-ethoxypropyltrimethoxysilane, 3-propxypropyltrimethoxysilane, 3-methoxyethyltrimethoxysilane, 3-ethoxyethyltrimethoxysilane, 3-propoxyethyltrimethoxysilane, 2-[methoxy(polethyleneoxy)propyl]heptamethyltrisiloxane, [methoxy(polyethyleneoxy)propyl]trimethoxysilane, [methoxy(polyethyleneoxy)ethyl]trimethoxysilane, [methoxy(polyethyleneoxy)ethyl]triethoxysilane, [methoxy(polyethyleneoxy)ethyl]trimethoxysilane, mixtures thereof and the like.

Examples of suitable alkoxysilanes with four hydrolyzable alkoxy groups include tetramethoxysilane, tetraethoxysilane, tetrapropoxysilane, tetraisopropoxysilane, tetrabutoxysilane, tetraisobutoxysilane, tetrakis(methoxyethoxy)silane, tetrakis(methoxypropoxy)silane, tetrakis(ethoxyethoxy)silane, tetrakis(methoxyethoxyethoxy)silane, tri(methoxyethoxy)silane, dimethoxydiethoxysilane, triethoxymethoxysilane, mixtures thereof, and the like.

Particularly useful alkoxysilanes include (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane, methacryloxymethyltrimethoxysilane, methacryloxymethyltriethoxysilane, tetraethoxysilane, tetramethoxysilane, 3-aminopropyltrimethoxysilane, 3-aminopropyltris(methoxyethoxyethoxy)silane, 3-aminopropylmethyldiethoxysilane, 3-aminopropyldimethylethoxysilane, 3-aminopropyltriethoxysilane, 3-(N-allylamino)propyltrimethoxysilane, N-(2-aminoethyl)-3-aminopropyltrimethoxysilane, acetoxypropyltrimethoxysilane, 2-cyanoethyltriethoxysilane, 3-cyanopropyltrimethoxysilane, (3,3,3-trifluoropropyl)trimethoxysilane, (tridecafluoro-1,1,2,2-tetrahydrooctyl)triethoxysilane, (heptadecafluoro-1,1,2,2-tetrahydrododecyl)triethoxysilane, 3-mercaptopropyltrimethoxysilane, vinyltrimethoxysilane, vinyltriethoxysilane, and mixtures thereof.

Especially suitable and useful alkoxysilanes include (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane, tetraethoxysilane, tetramethoxysilane, 3-aminopropyltrimethoxysilane, 3-aminopropyltriethoxysilane, acetoxypropyltrimethoxysilane, 3-cyanopropyltrimethoxysilane, (3,3,3-trifluoropropyl)trimethoxysilane, (tridecafluoro-1,1,2,2-tetrahydrooctyl)triethoxysilane, 3-mercaptopropyltrimethoxysilane, vinyltrimethoxysilane, vinyltriethoxysilane, and mixtures thereof.

In another embodiment, especially suitable and useful alkoxysilanes include (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane and mixtures thereof.

In yet another embodiment, especially suitable and useful alkoxysilanes include (3-glycidoxypropyl)trimethoxysilane, (3-methacryloxypropyl)trimethoxysilane, (3-methacryloxypropyl)triethoxysilane, and mixtures thereof.

Another reaction component is a phase transfer catalyst. Phase transfer catalysts are preferred for the hydrolysis and condensation of alkoxysilane monomers. Using a phase transfer catalyst in the reaction enables the alkoxy (OR) groups of the alkoxysilanes to be hydrolyzed with minimal or no damage to the organofunctional groups (OFG) of the alkoxysilanes. Thus, the resulting siloxane oligomers have very good functionality and can be rapidly cured.

The phase transfer catalyst, which is suitable for preparation of the siloxane oligomers has general formula II:

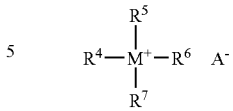

wherein M is phosphorus or nitrogen;
$R^4$, $R^5$, $R^6$, and $R^7$ are alkyl or aromatic groups; and
$A^-$ is a counter ion.

$R^4$, $R^5$, $R^6$, and $R^7$ are each independently straight, branched, cyclic alkyl groups or aromatic groups, and may be the same or different. In various embodiments, groups $R^4$, $R^5$, $R^6$, and $R^7$ each independently have from 1 to 10 carbon atoms.

In one embodiment, $A^-$ is $Cl^-$, $Br^-$, $OH^-$, $NO_3^-$, $COO^-$, $SO_4^{2-}$, $HSO_4^-$, $BF_4^-$, or $PF_6^-$. In another embodiment, $A^-$ is $Cl^-$ or $Br^-$. In some embodiments, $A^-$ is a counter ion excluding $F^-$. In other embodiments, $A^-$ is a counter ion with the proviso that A does not contain fluorine.

Examples of suitable phase transfer catalysts include benzyl tributyl ammonium bromide, benzyl tributyl ammonium chloride, benzyl triethyl ammonium bromide, benzyl triethyl ammonium chloride, benzyl trimethyl ammonium chloride, cetyl pyridinium bromide, cetyl pyridinium chloride, cetyl trimethyl ammonium bromide, didecyl dimethyl ammonium chloride, dimethyl distearyl ammonium bisulfate, dimethyl distearyl ammonium methosulfate, dodecyl trimethyl ammonium bromide, dodecyl trimethyl ammonium chloride, methyl tributyl ammonium chloride, methyl tributyl ammonium hydrogen sulfate, tricaprylylmethylammonium chloride (ALIQUAT® 336), methyl tributyl ammonium chloride (ALIQUAT® 175), methyl trioctyl ammonium chloride, myristyl trimethyl ammonium bromide, phenyl trimethyl ammonium chloride, tetrabutyl ammonium borohydride, tetrabutyl ammonium bromide (ALIQUAT® 100), tetrabutyl ammonium chloride, tetrabutyl ammonium hydrogen sulfate, tetrabutyl ammonium hydroxide, tetrabutyl ammonium iodide, tetrabutyl ammonium perchlorate, tetraethyl ammonium bromide, tetraethyl ammonium chloride, tetraethyl ammonium hydroxide, tetrahexyl ammonium bromide, tetrahexyl ammonium iodide, tetramethyl ammonium bromide, tetramethyl ammonium chloride, tetramethyl ammonium hydroxide, tetramethyl ammonium iodide, tetraoctyl ammonium bromide, tetrapropyl ammonium bromide, tetrapropyl ammonium chloride, tetrapropyl ammonium hydroxide, tributyl methyl ammonium chloride, triethyl benzyl ammonium chloride, benzyl triphenyl phosphonium bromide, benzyl triphenyl phosphonium chloride, butyl triphenyl phosphonium bromide, butyl triphenyl phosphonium chloride, ethyl triphenyl phosphonium acetate, ethyl triphenyl phosphonium bromide, ethyl triphenyl phosphonium iodide, methyl triphenyl phosphonium bromide, tetrabutyl phosphonium bromide, tetraphenyl phosphonium bromide, tetrabutyl phosphonium chloride, tetraoctylphosphonium bromide, and mixtures thereof.

Particularly useful phase transfer catalysts include tricaprylylmethylammonium chloride (ALIQUAT® 336), methyl tributyl ammonium chloride (ALIQUAT® 175), tetrabutyl ammonium bromide (ALIQUAT® 100), tetrabutyl ammonium hydrogen sulfate, triethyl benzyl ammonium chloride, tetrabutyl phosphonium bromide, tetrabutyl phosphonium chloride, tetraoctylphosphonium bromide, and mixtures thereof.

Especially suitable and useful phase transfer catalysts include tricaprylylmethylammonium chloride (ALIQUAT® 336), tetrabutyl phosphonium bromide, tetrabutyl phosphonium chloride, tetraoctylphosphonium bromide, and mixtures thereof.

In one embodiment the amount of the phase transfer catalyst used in preparation of the siloxane oligomers is at least 0.0005 grams per gram of alkoxysilane, or at least 0.001 grams per gram of alkoxysilane. In another embodiment, the amount of the phase transfer catalyst may be up to 0.2 grams per gram of alkoxysilane.

Water is another reaction component. In one embodiment, the amount of water used in preparation of the siloxane oligomers is at least about 0.5 moles per mole of alkoxysilane. In other embodiments, the amount of water present may be up to about 20 moles of water per mole of alkoxysilane, or up to about 5 moles of water per mole of alkoxysilane.

The reaction may be carried out without additional solvent. Optionally, however, a solvent may also be used in the reaction. Alkoxysilanes are typically immiscible with water. Therefore, the reaction between alkoxysilane and water proceeds slowly. Therefore, a solvent that is miscible with water, alkoxysilane, and the phase transfer catalyst can be used to increase the rate of the reaction. In one aspect, at least one solvent that is miscible with water, alkoxysilane, and the phase transfer catalyst but not miscible with the oligomer is used to increase the rate of reaction and to easily separate the oligomer from the alkoxysilane, water, the phase transfer catalyst, and the solvent. Solvents that may be used include alcohols, glycols, ethers, glycol ethers, ketones, esters, glycolether acetates, and mixtures thereof.

Suitable solvents include methanol, ethanol, propanol, isopropanol, butanol, isobutanol, secondary butanol, tertiary butanol, cyclohexanol, pentanol, octanol, decanol, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, tetrahydrofuran, dioxane, acetone, diacetone alcohol, methyl ethyl ketone, cyclohexanone, methyl isobutyl ketone, ethyl acetate, n-propyl acetate, n-butyl acetate, t-butyl acetate, propylene glycol monomethyl ether acetate, dipropylene glycol methyl ether acetate, 1-methoxy-2-propanol, ethyl 3-ethoxypropionate, 2-propoxyethanol, ethylene glycol ethyl ether acetate, and mixtures thereof.

Particularly useful solvents include ethanol, isopropanol, 1-methoxy-2-propanol, ethyl acetate, n-butyl acetate, t-butyl acetate, 2-propoxyethanol, propylene glycol monomethyl ether acetate, and mixtures thereof. Another particularly useful solvent is isopropanol.

One or more solvents may be used in various amounts to assist in obtaining desired reaction conditions. The amount of solvent used in preparation of the siloxane oligomers may be at least 0.01 moles per mole of the alkoxysilane, at least 0.1 moles per mole of the alkoxysilane, or at least 1 mole per mole of the alkoxysilane.

The reaction may be carried out at a range of temperatures. Preferably, the reaction will be carried out at a temperature that maximizes the reaction rate and minimizes the formation of side products. In one embodiment, the reaction is carried out at a temperature at or below the boiling point of the reaction mixture at atmospheric pressure. In various embodiments, the reaction temperature may be greater than about 10° C., greater than about 15° C., greater than about 25° C., greater than about 50° C., or greater than about 60° C. The reaction temperature may be less than about 150° C., less than about 100° C., less than about 80° C., or less than about 70° C.

The reaction may be conducted for a sufficient period of time to hydrolyze some, most, nearly all, or all of the alkoxysilane (Si—OR) groups, as defined in formula I. For example, the reaction may be continued for a period sufficient to hydrolyze at least 40 percent of all alkoxysilane groups, may be continued for a period sufficient to hydrolyze at least 70 percent of all alkoxysilane groups, may be continued for a period sufficient to hydrolyze at least 80 percent of all alkoxysilane groups, or may be continued for a period sufficient to hydrolyze at least 90 percent of all alkoxysilane groups. The extent of this conversion can be determined by following alkoxy group peak reduction (such as methoxy groups for methoxysilanes) using $^1$H-NMR (Nuclear Magnetic Resonance) spectroscopy.

The reaction may be continued for a sufficient period of time to obtain a siloxane oligomer with a weight average molecular weight in the range of 200 to 100,000. In various embodiments, the reaction may be continued for a sufficient period of time to obtain a siloxane oligomer with a weight average molecular weight equal to or greater than 1,000, or equal to or greater than 2,000. The reaction may be continued for a sufficient period of time to obtain a siloxane oligomer with a weight average molecular weight equal to or less than 50,000, or equal to or less than 20,000. The molecular weight of the siloxane oligomer may be determined using gel permeation chromatography (GPC). A suitable instrument for performing this analysis is model 2695 Separations Module equipped with model 2414 Refractive index detector, and three Styragel columns (models HR3, HR1, and HR0.5). The module, detector, and all three columns are manufactured by Waters Corporation (Connecticut, U.S.A.). The weight average molecular weight of the siloxane oligomer is determined relative to polystyrene standards purchased from Aldrich (Milwaukee, Wis.) under a catalog number 32,783-2. A ~0.1 wt % solution of the samples in THF is used for the GPC analyses. The siloxane oligomer may compose of oligomers of wide range of molecular weights. The oligomers that have a molecular weight of at least about 50 are included in calculations of the weight average molecular weight of the siloxane oligomer. The smaller molecular weight oligomers that may appear in the chromatogram are excluded from the calculations.

The reaction may be stopped after a sufficient period of time by using various methods. For example, the reaction may be stopped by removing the phase transfer catalyst from the reaction mixture. The phase transfer catalyst may be removed by suitable methods, including for example, by extraction using a different solvent, or by adsorption using active carbon or ion exchange resin. As the siloxane oligomer may have limited solubility in the reaction mixture, the phase transfer catalyst can also be removed by phase separation. If the reaction is carried out at sufficiently low temperatures, the phase separation of the oligomer from the phase transfer catalysts occurs during the reaction. The reaction may also be stopped by addition of agents suitable for end-capping of silanol groups known in the polymer synthesis art. The reaction may also be stopped by cooling down the reaction mixture below the reaction temperature, for example at least 5° C. below the reaction temperature, at least 10° C. below the reaction temperature, or at least 20° C. below the reaction temperature.

Abrasion resistant coatings may be produced using a composition including raw or purified siloxane oligomer. After the siloxane oligomer formation reaction is stopped, the formed siloxane oligomer is obtained in the reaction mixture. At this stage, the reaction mixture may also comprise other reaction components such as water, the phase transfer catalyst, the solvent, and/or reaction byproducts such as alcohol, low molecular weight siloxanes in the form of dimers, trimers, etc. At this raw stage, the reaction mixture may be in one phase or separated into more than one phase. One of these liquid phases may contain the formed siloxane oligomer in a greater quantity than the other. This reaction mixture that contains the formed siloxane oligomer, whether it is in one liquid phase or more than one liquid phase, may be used for preparation of the coating composition.

The formed siloxane oligomer may also be used for the preparation of the coating composition after it is purified by separating it from other components of the reaction mixture by using various methods. For example, the volatile components such as water or the solvent may be partially or essentially completely removed from the reaction mixture by evaporation. If there are more than one liquid phase after the reaction is stopped, the phase having a richer quantity of the formed siloxane oligomer may be separated by a separation funnel and then can be used. The phase separation of the reaction mixture may also be obtained by cooling down the reaction mixture or adding a suitable solvent. After the oligomer rich phase is separated, the residual solvent can further be evaporated. The phase transfer catalyst may be removed from the reaction mixture by extraction using a different solvent, or by adsorption using active carbon or ion exchange resin. The formed siloxane oligomer may be used for the preparation of the coating composition at any partially or essentially completely purified level.

To determine the amount of the formed siloxane oligomer, a sample is taken from the reaction mixture or from the purified mixture. The volatile components are then evaporated from this sample until the weight change of the sample becomes essentially negligible. This sample is then analyzed by using $^1$H-NMR (Nuclear Magnetic Resonance) spectroscopy and/or GPC (Gel Permeation Chromatography) to determine the amount of impurities present together with the formed siloxane oligomer. These impurities may include the phase transfer catalyst, the residual solvent, and low molecular weight siloxanes in the form of dimers, trimers, etc.

A coating composition may be prepared using any of these obtained siloxane oligomers or mixtures of these oligomers prepared separately. The prepared coating composition may be mixed with a suitable curing catalyst, with a suitable solvent, or mixed with both. A curing catalyst may be added to a coating composition to accelerate the rate of conversion of the siloxane oligomers into highly cross-linked abrasion resistant coatings. A solvent may be added to a coating composition to adjust the viscosity of the coating composition and also to aid in increasing the miscibility of the curing catalyst with the siloxane oligomer.

In some embodiments, the coating composition creates an abrasion resistant coating. In one embodiment, the coating composition comprises at least one siloxane oligomer and at least one latent curing catalyst. In another embodiment, the coating composition comprises at least one siloxane prepared using a phase transfer catalyst and at least one latent curing catalyst. A latent curing catalyst is any type of compound that is stable in ambient conditions, but upon the application of thermal or ultra-violet (UV) energy such catalyst can release active components. These released active components can catalyze the curing reaction of coating compositions.

Coating compositions may be made using a thermal latent curing catalyst. Especially suitable siloxane oligomers for use with thermal curing include those with epoxy groups and epoxycyclohexyl groups. Epoxy and epoxycyclohexyl functionalized siloxane oligomers may be prepared using alkoxysilanes such as (3-glycidoxypropyl)trimethoxysilane, (3-glycidoxypropyl)dimethylethoxysilane, (3-glycidoxypropyl)dimethylethoxysilane, (3-glycidoxypropyl)methyldiethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-glycidoxypropyl)dimethylethoxysilane, (3-glycidoxypropyl)methyldiethoxysilane, and mixtures thereof. Particularly useful alkoxysilanes for such oligomer preparation are (3-glycidoxypropyl)trimethoxysilane, 2-(3, 4-epoxycyclohexyl)ethyltrimethoxysilane, 2-(3,4-epoxycyclohexyl)ethyltriethoxysilane, 5,6-epoxyhexyltriethoxysilane, and mixtures thereof.

Suitable thermal latent curing catalysts include compounds of imidazole, amine, phosphonium, ylidene, ammonium, imidazole salt, iodonium, and sulfonium, coordination compounds or salts, anionic compounds, sulfonate compounds, and mixtures thereof. Such curing catalysts are available from Air Products (Allen Town, Pa.), Ajinomoto Corporation (Tokyo, Japan), Asahi Denko Corporation (Tokyo, Japan), Dow Chemical Corporation (Midland, Mich.), King Industries (Norwalk, Conn.), Leepoxy Plastics (Ft. Wayne, Ind.), Miller-Stephenson Chemical Corporation (Sylmar, Calif.), and Shikoku Corporation (Kagawa, Japan).

Examples of suitable imidazole and amine compounds include: 4H-imidazole; 2H-isoimidazole; 1H-imidazole; butylimidazole; 1,3-cyclohexanedimethanamine; 2-methylimidazoleazine; 1-benzyl-2-methylimidazole; N,N'-bis (dimethylcarbamoyl)-2,4-toluidine; N,N-dimethyl-N'-phenylurea; 1H-imidazole; 4,5-bis[(octadecyloxy)methyl]-2-phenyl-4-methylimidazole; 5-(hydroxymethyl)-4-methyl-2-phenylimidazole; 2,4,5-triphenyl-1,3-imidazole; 2-phenylimidazole; 2-methylimidazole; 2,4-dimethyl-1H-imidazole; 4-methyl-2-ethylimidazole; 2-(p-dimethylaminophenyl)-4,5-diphenylimidazole; 2-(o-methoxyphenyl)-4, 5-diphenyl-imidazole; 2-methyl-4,5-diphenylimidazole; N-vinyl-2-methylimidazole; 2,2'-p-phenylenebis[4,5-diphenyl]-imidazole; 2-styryl-imidazole; 2-(2-hydroxyphenyl)-4, 5-diphenylimidazole; 2-undecylimidazole; 2-(n-heptadecyl) imidazole; 2-n-heptadecylimidazole; 1-(cyanoethyl)-2-phenylimidazole; 1-(cyanoethyl)-2-undecylimidazole; 1-cyanoethyl-2-ethyl-4-methylimidazole; 1-cyanoethyl-2-methylimidazole; 2-methyl-1-imidazolepropanenitrile; 2-heptadecyl-4-methylimidazole; 2-(naphthyl)-4,5-diphenyl-imidazole; N-propyl-2-methylimidazole; 2-phenyl-4,5-dihydroxymethylimidazole; phenyl-1H-imidazole; 3-(4,5-diphenyl-1H-imidazol-2-yl)-phenol; [2-(2-methyl-1H-imidazol-1-yl)ethyl]-guanidine; 5-(1,1-dimethylethyl)-2-(4, 5-diphenyl-1H-imidazol-2-yl)-phenol; 2-[2-(4-methoxyphenyl)ethenyl]-1H-imidazole; 2-(heptadecenyl)-4-methyl-1H-imidazole; 2-undecenylimidazole; phenylmethyl-1H-imidazole; 1-[(dodecylphenyl)methyl]-2-methyl-1H-imidazole; N,N"-(methylenediphenylene)bis[N, N'-dimethyl]-urea; N-(3,4-dichlorophenyl)-N',N'-dimethylurea; 1-(4-hydroxy-1-oxobutyl)piperidine; and mixtures thereof.

Examples of suitable phosphonium compounds include triphenylphosphonium hexafluoroantimonate; ethyltris(4-methylphenyl)-phosphonium bromide; benzyltriphenylphosphonium hexafluoroantimonate; 9-fluorenyltriphenylphosphonium hexafluoroantimonate; tetraphenylphosphonium chloride; tetraphenylphosphonium bromide; tetrabutylphosphonium bromide; phosphonium, [1,4-phenylenebis(methylene)]bis[triphenyl]-, bis[(OC-6-11)-hexafluoroantimonate(1-)]; phosphonium, 1,2-ethanediylbis[diphenyl(phenylmethyl)-, bis[(OC-6-11 )-hexafluoroantimonate(1-)]; phosphonium, 1,2-ethanediylbis[[(4-chlorophenyl)methyl]diphenyl-, bis[(OC-6-11)-hexafluoroantimonate(1-)]; phosphonium, 1,2-ethanediylbis[[(2-fluorophenyl)methyl]diphenyl-, bis[(OC-6-11)-hexafluoroantimonate(1-)]; phosphonium, 1,2-ethanediylbis[[(2,4-dichlorophenyl)methyl]diphenyl-, bis[(OC-6-11)-hexafluoroantimonate(1-)]; phosphonium, 1,2-ethanediylbis[[(2,4-difluorophenyl)methyl]diphenyl-, bis[(OC-6-11)-hexafluoroantimonate(1-)]; phosphonium, 1,2-ethanediylbis[[(2,6-difluorophenyl)methyl]diphenyl-, bis[(OC-6-11)-hexafluoroantimonate(1-)]; phosphonium, 1,2-ethanediylbis[diphenyl[[2-(trifluoromethyl)phenyl]methyl]-, bis[(OC-6-11)-hexafluoroantimonate(1-)]; phosphonium, 1,2-ethanediylbis[diphenyl[[4-(trifluoromethyl)phenyl]methyl]-, bis[(OC-6-11)-hexafluoroantimonate(1-)]; phosphonium, [1,2-phenylenebis(methylene)]bis[triphenyl-, bis[(OC-6-11)-hexafluoroantimonate(1-)]; 2,5-benzodiphosphocinium, 1,2,3,4,5,6-hexahydro-2,2,5,5-tetraphenyl-, bis[(OC-6-11)-hexafluoroantimonate(1-)]; 1,4-diphosphorinanium, 1,1,2,3,4,4-hexaphenyl-, bis[(OC-6-11)-hexafluoroantimonate(1-)]; tetraphenylphosphonium tetraphenylborate; and mixtures thereof.

Examples of suitable ylidene compounds include 1-phenyl-2-(triphenylphosphoranylidene)-ethanone; 1,3-diphenyl-2-(triphenylphosphoranylidene)-1,3-propanedione; triphenylphosphonium cyclopentadienylide; (triphenylphosphoranylidene)-acetic acid phenyl ester; 4-[(triphenylphosphoranylidene)methyl] benzonitrile; and mixtures thereof.

Examples of suitable ammonium compounds include N-2-butenyl-N,N,4-trimethylbenzenaminium hexafluoroantimonate; 3,5-dimethyl-1-(phenylmethyl)-pyrazinium hexafluoroantimonate(1-); tetraethylammonium perchlorate; tetrabutylammonium bromide; tetraethylammonium tosylate; N-benzylpyrazinium hexafluoroantimonate; N-benzylquinoxalinium hexafluoroantimonate; 3-methyl-1-(phenylmethyl)pyridinium hexafluoroantimonite; 3-cyano-1-(phenylmethyl)pyrazinium hexafluoroantimonate; 3-methyl-1-(phenylmethyl)pyrazinium hexafluoroantimonite; triethylammonium tetraphenylborate; hydrazinium, 2-acetyl-1-(2-hydroxypropyl)-1,1-dimethyl-, inner salt; hydrazinium, 1-(2-hydroxypropyl)-2-(methoxyacetyl)-1,1-dimethyl-, inner salt; hydrazinium, 2-(hydroxyphenylacetyl)-1-(2-hydroxypropyl)-1,1-dimethyl-, inner salt; hydrazinium, 2-(2-hydroxy-2-methyl-1-oxopropyl)-1-(2-hydroxypropyl)-1,1-dimethyl-, inner salt; hydrazinium, 2-(2-hydroxy-1-oxohexyl)-1-(2-hydroxypropyl)-1,1-dimethyl-, inner salt; hydrazinium, 2-(dimethoxyacetyl)-1-(2-hydroxypropyl)-1,1-dimethyl-, inner salt; hydrazinium, 2-(2,2-dimethyl-1-oxopropyl)-1-(2-hydroxypropyl)-1,1-dimethyl-, inner salt; hydrazinium, 1-(2,3-dihydroxypropyl)-1,1-dimethyl-2-(1-oxopropyl)-, inner salt; hydrazinium, 1-(2-hydroxyundecyl)-1,1-dimethyl-2-(1-oxopropyl)-, inner salt; hydrazinium, 1-(2-hydroxybutyl)-1,1-dimethyl-2-(1-oxopropyl)-, inner salt; hydrazinium, 1-(2-hydroxyheptyl)-1,1-dimethyl-2-(1-oxopropyl)-, inner salt; hydrazinium, 1-(2-hydroxy-3-methoxypropyl)-1,1-dimethyl-2-(1-oxopropyl)-, inner salt; hydrazinium, 2-(cyclopropylcarbonyl)-1-(2-hydroxypropyl)-1,1-dimethyl-, inner salt; and mixtures thereof.

Examples of suitable imidazole salt compounds include 2-heptadecyl-1H-imidazole phosphate; imidazolium dihydrogen phosphate; 2-ethyl-4-methylimidazole-phosphoric acid salt (1:1); 2-phenylimidazole-phosphoric acid salt (1:1); 1-methylimidazole-phosphoric acid salt (1:1); 1-methylimidazole-phosphoric acid salt (1:1); 2-ethylimidazole-phosphoric acid salt (1:1); and mixtures thereof.

Examples of suitable iodonium compounds include p-octyloxyphenylphenyliodonium hexafluoroantimonate; di(4-tert-butylphenyl)iodonium hexafluoroantimonate; bis[4-(octadecyloxy)phenyl]iodonium hexafluoroantimonite; and mixtures thereof.

Examples of suitable sulfonium compounds include dimethyl(2-oxo-2-phenylethyl)sulfonium hexafluoroantimonate; methyl[4-(octadecyloxy)phenyl](phenylmethyl)sulfonium hexafluoroantimonate; methyl[4-(octadecyloxy)phenyl](phenylmethyl)sulfonium hexafluoroarsenate; diphenyl[4-(phenylthio)phenyl]sulfonium hexafluoro arsenate; [4-(Phenylthio)phenyl]diphenyl sulfonium hexafluorophosphate; benzyl(4-hydroxyphenyl)methylsulfonium hexafluoroantimonate; tris[4-(octadecyloxy)phenyl]sulfonium hexafluoroantimonate; (thiodi-4,1-phenylene)bis[bis[4-(2-hydroxyethoxy)phenyl]sulfonium]; hexafluoroantimonate; p-acetoxyphenylbenzylmethylsulfonium hexafluoroantimonate; (2-Butenyl)tetramethylenesulfonium hexafluoroantimonate; benzothiophene, s-methylsulfonium derivative; n-butanethiol, s-methylsulfonium derivative; tetrahydrothiophene, s-methylsulfonium derivative; thiophene, s-methylsulfonium derivative; diethyl disulfide, s-methylsulfonium derivative; dibenzothiophene, s-methylsulfonium derivative; 2-methylthiophene, s-methylsulfonium derivative; 2,5-dimethylthiophene, s-methylsulfonium derivative; tetrahydro-1-methylthiophenium tetrafluoroborate; 10-meihylphenoxathiinium tetrafluoroborate; S-methyldibenzothiophenium tetrafluoroborate; S-methylthianthrenium tetrafluoroborate dimethylphenylsulfonium tetrafluoroborate; methyl(1-methylethyl)phenylsulfonium tetrafluoroborate; methyloctylphenylsulfonium tetrafluoroborate; 2,8-diethyl-5-methyl-dibenzothiophenium tetrafluoroborate; 2,8-dimethoxy-5-methyl-dibenzothiophenium tetrafluoroborate; and mixtures thereof.

Examples of suitable coordination compounds or salts include aluminum triisopropylate; aluminum tristearate; tris(octadecyl acetoacetato)aluminum; tris(hexadecyl acetoacetato)aluminum; aluminum tris(acetylacetonate); aluminum tris(ethyl acetylacetate); copper, mercapto(trichloroacetylamino)thiadiazole complex; silicic acid ($H_4SiO_4$), tetrakis (1-methyl-3-oxo-1-hexenyl) ester; zinc(II) 2-ethylhexanoate; zinc(II) triflate; zinc(II) acetylacetonate; zinc(II) chloride; magnesium(II) perchlorate; magnesium tetrafluoroborate; copper(2+) imidazolate; cobaltous acetylacetonate; zinc imidazolate; silver imidazolate; boron trifluoride-piperidine complex; trifluoroboron-diethyl ether; boron trichloride-N,N-dimethyloctylamine complex; boron trifluoride-isopropylamine complex; tris(2,4,6-trimethoxyphenyl)phosphine; tris(2,4,6-trimethoxyphenyl)phosphine; and mixtures thereof.

Examples of suitable anionic compounds include triphosphonitrile chloride; hexamethoxycyclotriphosphazene; hexakis(dimethylamino)triphosphonitrile; hexaphenyl cyclotriphosphazene; hexaphenoxycyclotriphosphazatriene; and mixtures thereof.

Examples of suitable sulfonate compounds include p-methylbenzenesulfonic acid methyl ester; 2-octanol, 4-methylbenzenesulfonate; 4,4'-bis(tert-butoxycarbonyloxy)diphenylsulfone; N-(trifluoromethylsulfonyloxy)-1,8-naphthalimide; and mixtures thereof.

Other suitable thermal latent curing catalysts include halotriazines (disclosed in U.S. patent application 2003/0189264), and thioanium salts especially hexafluoropropane sulfonate and nitrobenzyl esters (disclosed in U.S. patent application 2002/0160316). These theremal latent curing catalysts could also be used alone or in combination with other thermal latent curing catalysts in coating compositions of the current invention.

Particularly useful thermal latent curing catalysts include ammonium antimonite and boron trifluoride complex with amine.

The amount of thermal latent curing catalyst present in a coating composition may be described by using catalyst ratio. The latent curing catalyst ratio is defined as the ratio of the amount of latent catalyst in grams to 100 grams of siloxane oligomer. In some embodiments, the thermal latent catalyst ratio in coating compositions may be greater than about 0.1, greater than about 0.5, or greater than about 1.0. In some embodiments, the thermal latent catalyst ratio may be less than about 5.0, less than about 3.0, or less than about 2.0.

Coating compositions may be made using a UV latent curing catalyst. Especially suitable siloxane oligomers for use with UV curing include those with epoxy groups, epoxycyclohexyl groups, acrylate groups, and methacrylate groups.

Epoxy and epoxycyclohexyl functionalized siloxane oligomers may be prepared using alkoxysilanes, including (3-glycidoxypropyl)trimethoxysilane, (3-glycidoxypropyl)dimethylethoxysilane, (3-glycidoxypropyl)dimethylethoxysilane, (3-glycidoxypropyl)methyldiethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-glycidoxypropyl)dimethylethoxysilane, (3-glycidoxypropyl)methyldiethoxysilane, and mixtures thereof. Particularly useful alkoxysilanes for preparation of such oligomers are (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, and mixtures thereof.

Acrylate and methacrylate functionalized siloxane oligomers may be prepared using alkoxysilanes, including (3-methacryloxypropyl)trimethoxysilane, 3-methacryloxypropyltriethoxysilane, (3-acryloxypropyl)trimethoxysilane, (3-acryloxypropyl)methyldimethoxysilane, (3-acryloxypropyl)dimethylmethoxysilane, (methacryloxymethyl)dimethylethoxysilane, methacryloxymethyltrimethoxysilane, methacryloxymethyltriethoxysilane, and mixtures thereof. Particularly useful alkoxysilanes are (3-methacryloxypropyl)trimethoxysilane, 3-methacryloxypropyltriethoxysilane, (3-acryloxypropyl)trimethoxysilane, methacryloxymethyltrimethoxysilane, methacryloxymethyltriethoxysilane, and mixtures thereof.

Coating compositions may be made using cationic type UV latent curing catalysts. Examples of cationic type UV latent curing catalysts include diaryliodonium salt, dialkylphenacylsulfonium, ferrocenium salt, triarylsulfonium salt and the like and mixtures thereof. Further examples of cationic UV curing catalysts are described in Crivello, U.S. Pat. No. 6,391,999. Especially suitable siloxane oligomers for use with cationic type UV latent curing catalysts include those with epoxy groups and epoxycyclohexyl groups.

Coating compositions may be made using free-radical UV latent curing catalysts. Examples of free-radical type UV latent curing catalysts include benzoin; benzoin alkyl ethers; acylphosphine oxides; 1,1-diethoxyacetophenone; 1-benzoylcyclohexanol; benzophenone; 2,2-dimethoxy-2-phenylacetophenone; 2-methyl-1-[4-(methylthio)phenyl]-2-(4-morpholinyl)-1-propanone; 1-hydroxycyclohexyl phenyl ketone; and the like, and mixtures thereof. One supplier of such catalysts is Ciba Specialty Chemicals (Basel, Switzerland). Especially suitable siloxane oligomers for use with free-radical UV latent curing catalysts include acrylate and methacrylate functionalized siloxane oligomers.

The amount of UV latent curing catalyst present in a coating composition may be described by using catalyst ratio. The latent curing catalyst ratio is defined as the ratio of the amount of latent catalyst in grams to 100 grams of the siloxane oligomer. In some embodiments, the UV latent catalyst ratio in coating compositions may be greater than about 0.1, greater than about 0.5, greater than about 1, or greater than about 2. In some embodiments, the UV latent catalyst ratio may be less than about 15, less than about 10, less than about 7, or less than about 5.

Coating compositions may optionally further comprise at least one solvent. The solvent may increase miscibility of the siloxane oligomer with other components of the coating composition, such as the curing catalyst, metal oxide particles, or other additives or components. The solvent can also be added to a coating composition to adjust the viscosity of the composition and thereby affect or control the coating thickness.

In some embodiments, the coating composition may have a viscosity greater than about 1 centipoise, greater than about 2 centipoise, or greater than about 3 centipoise. In, some embodiments, the coating composition may have a viscosity less than about 150 centipoise, less than about 30 centipoise, or less than about 10 centipoise. A solvent can play a role in obtaining the desired viscosity for the coating composition. In some cases, a siloxane oligomer may have a viscosity within a desired range, and may be directly applied as a coating composition. In some cases, a siloxane oligomer will have a higher viscosity, and a solvent may be added to adjust the viscosity to the desired viscosity range.

The viscosity of the coating composition may be measured at about 21° C. by a rheometer (DV-II+, available from Brookfield Corporation, Middleboro, Mass.). The operating instructions provided for this rheometer in a manual no. M/92-161-H895 published by Brookfield Corporation may be followed to carry out these measurements. A sample volume of about 16 milliliters may be used. The spindle ULA-15 with the sample chamber ULA-31Y (both available from Brookfield Corporation) is suitable for measurements in the range of 1 centipoise to 2,000 centipoises. A spindle speed of 60 rpm may generally be used in such measurements. The viscosity data are recorded about 5 seconds after the spindle is turned on. Ten data points may be taken with an interval of about 5 seconds. And an arithmetic average of these 10 points may be reported as a viscosity of the formulation.

In one embodiment, suitable solvents for the coating composition include alcohols, glycols, ethers, glycol ethers, ketones, esters, glycolether acetates, and mixtures thereof. Examples of suitable solvents include methanol, ethanol, propanol, isopropanol, butanol, isobutanol, secondary butanol, tertiary butanol, cyclohexanol, pentanol, octanol, decanol, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, tetrahydrofuran, dioxane, acetone, diacetone alcohol, methyl ethyl ketone, cyclohexanone, methyl isobutyl ketone, ethyl acetate, n-propylacetate, n-butyl acetate, t-butyl acetate, propylene-glycol monomethyl ether acetate, dipropylene glycol methyl ether acetate, ethyl 3-ethoxypropionate, ethylene glycol ethyl ether acetate, propylene glycol monomethyl ether acetate, 1-methoxy-2-propanol, 2-propoxyethanol, acrylic acid and mixtures thereof.

Particularly useful solvents are ethanol, isopropanol, 1-methoxy-2-propanol, ethyl acetate, n-butyl acetate, t-butyl acetate, 2-propoxyethanol, propylene glycol monomethyl ether acetate, and mixtures thereof.

The coating composition may optionally include metal oxide particles. The addition of metal oxide particles can increase the abrasion resistance of the coating. These metal oxide particles may also be added to increase refractive index and/or to provide an antistatic property. Examples of suitable metal oxide particles include particles of silica, zirconium oxide, zinc oxide, titanium oxide, aluminum oxide, cerium oxide, tin oxide, yttrium oxide, antimony pentoxide, and mixtures thereof. Examples of metal oxides also include composite metal oxides such as silica-titania, indium tin oxide, antimony tin oxide, and mixtures thereof. In various embodiments, the average particle size of the metal oxides may be smaller than about 100 nm, or smaller than about 50 nm The metal oxide particles may be added to a coating composition in the form of a dry powder, or in a colloidal dispersion in a suitable liquid, or in another form. Dry powders and/or colloidal dispersions of metal oxide particles in aqueous or non-aqueous solutions are commercially available from various sources including Nalco Company (Naperville, Ill.), Nyacol Nano-Technologies Incorporated (Ashland, Mass.), Nissan Chemical Industries (Tokyo, Japan), Grace Davison (Columbia, Md.), Clariant Corporation (Charlotte, N.C.), Cabot Corporation (Billerica, Mass.), Degussa Advanced Nanomaterials (Hanau-Wolfgang, Germany), and Catalysts and Chemicals Industries (Tokyo, Japan).

In some cases, the metal oxide particles have functional groups on their surfaces that are suitable for increasing the miscibility of the particles with the coating composition. Metal oxide particles with such functional groups can be commercially obtained from Nissan Chemical Industries, Clariant Corporation, and Cabot Corporation. Preparation of such particles is also described in references such as Wilhelm, U.S. Pat. No. 6,335,380, which describes a method for surface modification of colloidal silica with a vinyl silane, and Tilley, EP 0505737, which describes preparation of (meth)acrylate functionalized colloidal silica.

A coating composition comprising metal oxide particles can be characterized using a particle ratio. The particle ratio is defined as the ratio of the amount of metal oxide particles in grams to 100 grams of the siloxane oligomer in the coating composition. In various embodiments, the particle ratio may be greater than about 0.1, greater than about 20, or greater than about 30. In various embodiments, the particle ratio may be less than about 200, less than about 100, or less than about 70.

In measuring or describing a coating composition, the term "solid content" may be used. The solid content is defined as the weight percentage ratio of the total amount of non-volatile components of the coating composition, which is total amount of the siloxane oligomer, the curing catalyst, and if present the metal oxide particles, in grams to 100 grams of composition. The solvent constitutes the remaining portion of the composition. In various embodiments, the solid content of a coating composition may be greater than about 20%, or greater than about 30%. In various embodiments, the solid content of a coating composition may be less than about 60%, or less than about 50%.

Optionally, a coating composition may further comprise leveling or flow control agents. These agents may be added to assist in obtaining uniform coatings. Suitable flow control agents include fluorosurfactants, such as Novec FC4430 or FC4432 (available from 3M Performance Materials Division, St. Paul, Minn.). The amount of leveling or flow control agent present may be in the range of 10 ppm to 20,000 ppm.

Optionally, a coating composition may further comprise other agents such as ultraviolet absorbers, antioxidants, and the like. These can be added to the coating composition to provide additional functionalities to the cured coating.

These coating compositions can be deposited on at least one surface of an article to form abrasion resistant coatings. The articles to be coated can be transparent or non-transparent. Examples of suitable articles include cover plates of display devices such as field emission displays, liquid crystal displays (LCDs), plasma display panels (PDPs), electroluminescence displays (ELDs), cathode ray tube displays (CRTs), fluorescence tube displays, meters, clocks, and the like. These articles may be used in the manufacture of televisions, personal digital assistants (PDAs), cellular phones, vehicle dashboards, projection screens, hand-held games and the like. Other optical articles such as eyeglasses, lenses, prisms, optical windows, photomask substrates, pellicles used in photomask assemblies, and the like also can be coated with the coating compositions to provide abrasion-resistant properties.

These articles may have simple rectangular and flat shapes or may have complicated shapes with curvatures and bends. The articles may be made of polymers, glasses, ceramics, or hybrids of these materials. Examples of suitable polymeric articles comprise poly(methyl methacrylate) (PMMA), polycarbonate (PC), poly(ethylene terephthalate) (PET), polystyrene, poly(diethylene glycol-bis-allyl carbonate) (ADC) or CR-39®, triacetyl cellulose (TAC), poly (ethylene-2,6-naphthalate) (PEN), and the like.

The surface of the article may be modified prior to depositing the coating. The surface may be modified to aid adhesion of the coating to the surface of the article, or for other reasons. Techniques for modifying the surface are generally well known and described in the prior art. These techniques include corona discharge, chemical etching (particularly by use of a NaOH or KOH solution), or deposition of a primer layer to increase adhesion of the abrasion resistant coating to the article. An example of a primer composition is primer PR1133 (available from SDC Corporation, Anaheim, Calif.). This primer is particularly suitable for depositing a primer layer for siloxane oligomers that have epoxy functional groups. This primer may be deposited by following the technical datasheet available from SDC Corporation.

After any optional preparation of the surface of the article is complete, the coating composition may be deposited on the article. The composition may be deposited onto the article using any suitable coating technique commonly known in the industry. These coating techniques include dip-coating, spin-coating, roll-coating, flow-coating, spray-coating, and meniscus-coating. In general, spray-coating is less preferable, because it sometimes can be difficult to obtain uniform coatings using this technique. Coatings prepared by a spray-coating technique are generally thicker at the periphery than at the center.

Using a dip-coating procedure, the article may be clamped to a cantilevered arm and dipped into a container containing the coating composition. Preferably, the container will be a plastic container. Preferably, the container and the cantilevered arm are enclosed within a chamber having controlled humidity. It has been found that controlling humidity is an important factor to ensure the depositing of transparent, defect-free coating layers. The relative humidity within the chamber is preferably controlled to be in a range from 20% to 70% relative humidity. Higher humidity can cause the formation of defects in the deposited coating, which may be visible to the unaided eye. In addition, the temperature within the chamber is preferably maintained in the range of 15 to 30° C.

In one dip-coating process, a drive system moves a cantilevered arm and the article to be coated down and up along a vertical or inclined axis. The range of motion must be sufficient to dip the article fully into and out of the container that holds the coating composition. The coating is deposited by lowering the cantilevered arm and the article at a predetermined speed into the container. After remaining submerged for a brief time, the article is withdrawn from the solution at a predetermined speed. The drive system generally includes a suitably programmed computer for precisely controlling the withdrawal speed of the arm and the article. Controlling the withdrawal speed is an important factor in controlling the thickness of the deposited layer, as slower withdrawal speeds generally yield thinner coating layers. A thinner coating might not be sufficient to provide the desired abrasion resistance, and thicker coatings may crack and/or trap bubbles. The optimum withdrawal speed may be readily determined for the abrasion resistant coating composition used.

The thickness of the coating may be adjusted to meet the requirements of the article and use desired. For example, the thickness of the coating may provide a desired abrasion resistant property to a coated article. In various embodiments, the coating composition is deposited on articles to obtain a coating that has a thickness greater than about 0.5 micrometers, greater than about 1 micrometer, or greater than about 2 micrometers. In various embodiments, the coating composition is deposited on articles to obtain a coating that has a thickness less than about 20 micrometers, less than about 10 micrometers, or less than about 8 micrometers.

Following the deposition of the coating composition, the coated article may be dried at ambient temperature and in ambient air. In various embodiments, the drying time may be greater than about 5 minutes, or greater than about 10 minutes. In some embodiments the drying time may be less than about 30 minutes. The drying time may depend upon the solvent used, the siloxane oligomer used, or other features of the coating composition. The drying may also be carried out at the same time as the curing takes place. This may be particularly desirable when thermal curing is utilized.

After drying, the coating on the coated article may be cured. The coating may be cured thermally or by application of an actinic radiation. The type of curing depends on the organofunctional group of the siloxane oligomer and the type of the curing catalyst used, if any. The drying and curing steps may cause evaporation of residual organics from the deposited coating and assist in completing polymerization reactions. The drying and curing steps yield a solid film coating having some residual porosity and mechanical strength.

In general, the combination of curing temperature and curing time can be experimentally determined, as the combination will vary based upon the components of the thermally curable coating composition. In general however, the lower temperature limit for the thermal curing is the temperature above which the thermal latent curing catalyst becomes active. The following conditions are for general guidance, and do not limit the invention in any way. In various embodiments, the curing temperature may be greater than about 40° C., greater than about 50° C., or greater than about 80° C. In various embodiments, the curing temperature may be less than about 300° C., less than about 200° C., or less than about 140° C. In various embodiments, the curing time may be greater than about 0.001 minutes, greater than about 0.01 minutes, or greater than about 0.1 minutes. In various embodiments, the curing time may be less than about 24 hours, less than about 10 hours, or less than about 4 hours. The properties of the final coating may be affected by the curing temperature and curing time used. For example, the abrasion resistance of the coating may generally be increased by utilizing a higher curing temperature and/or longer curing time. However, if the curing temperature is above the glass transition temperature or melting temperature of the article, the curing should be carried out for a duration less than that which would cause deformation of the article. In addition, the curing should not be carried out at temperatures higher and for curing durations longer than those that may cause thermal degradation or oxidation of the article and/or the coating. Such thermal reactions may result in formation of undesired colors, bubbles, or the like, and which lead to deterioration of the optical or aesthetic properties of the coated article. The tolerance levels for deformation and thermal degradation are determined by the requirements of the specific application. Preferably, the coating will be cured sufficiently to form an abrasion resistant coating.

The coating may be thermally cured. Thermal curing may be carried out in a conventional electrical oven. Thermal curing may also be achieved by blowing a hot gas over the article or subjecting the article to an infra-red radiation. The apparatus and the method described by Raychaudhuri et al. in U.S. Pat. No. 6,871,418 may also be used to cure the coatings described in this invention. UV curing may be carried out by applying UV radiation to the coated article, using methods as known in the art.

It has been found that combination of the solid content of the coating composition, the particle ratio of the composition, and the coating thickness all have an impact on the properties of the obtained coating. The solid content and particle ratio are as described above. A coating thickness may be measured using various test equipment. For example, the thickness of a coating may be measured using test equipment F20-HC (available from Filmetrics Inc., San Diego, Calif.).

The abrasion resistance of the cured coating may be determined by using a Bayer test. The Bayer test procedure is described in a publication entitled "Bayer Test-Standard Operating Procedure" (available from Colts Laboratories, Clearwater, Fla., dated Sep. 1, 1997). The Bayer test was carried out for 300 cycles using a BTE Bayer Tester (available from Colts Laboratories). An uncoated CR-39 Base 6 plano lens (available from DC Optical Laboratories, Oakland, Calif.) was used as a reference. The test results are obtained in a measurement called a Bayer ratio. A Bayer ratio is a measure of abrasion resistance. The test is conducted by subjecting a sample and a reference to the same abrasion conditions. The haze of a sample and reference are measured before and after the test. The Bayer ratio is calculated by ratioing the change in haze of the reference to the change in haze of the sample. A Bayer ratio of 1.0 means that the sample performed equally as well as the reference, and a higher Bayer ratio means that the sample performed better than the reference. In various embodiments, the coating will have a Bayer ratio greater than about 0.5, greater than about 1.0, greater than about 1.5, greater than 2.0, or greater than 2.5.

The adhesion of the coating to an article may be tested by following a cross-cut tape adhesion test as described in a Japanese Industrial Standard JIS K 5600-5-6. The sample is tested by scoring 10 vertical and 10 horizontal lines to make a 10×10 grid of very small squares. Tape is pressed onto the surface, and then removed. The number of squares removed is counted, and this count correlates to a rating. An adhesion rating of Y1 is an acceptable level of adhesion for the coating.

Aspects of the invention may be better understood by the following examples. These examples are illustrative only and are not intended as limiting.

EXAMPLE 1

An epoxy functionalized siloxane oligomer was prepared using the following procedure. The following components were added to a one liter flask: 750 grams of an alkoxysilane, (3-glycidoxypropyl)trimethoxysilane (GPTMOS) (available from Gelest Inc., Morrisville, Pa.); 197 grams of isopropanol; 85.7 grams of water; and 7.5 grams of a phase transfer catalyst, tricaprylylmethylammonium chloride (ALIQUAT® 336, available from Sigma Aldrich, St. Louis, Miss.). After addition, the components were mixed together and stirred at room temperature for 16 hours. The mixture was then transferred to a separation funnel and kept in a refrigerator at 4° C. for 2 hours. The mixture formed two liquid phases and the bottom liquid phase was separated.

The bottom liquid was then analyzed by a single pulse $^1$H-NMR (Nuclear Magnetic Resonance) spectroscopy, using model Eclipse 400+ (JEOL Corporation, Japan). Acetone $d_6$ was used as a solvent for this analysis. A summary of the spectra obtained was $^1$H-NMR 400 MHz) δ (ppm): 0.747 (s, b, 2H, SiCH$_2$CH$_2$), 1.728 (s, b, 2H, SiCH$_2$CH$_2$), 2.531 (m, b, 1H, CHOCHH), 2.700 (m, b, 1H, CHOCHH), 3.077 (s, b, CHOCH$_2$), 3.292 (m, b, 1H, OCHHCHOCH$_2$), 3.487 (m, b, 2H, SiCH$_2$CH$_2$CH$_2$), 3.709 (m, b, 1H, OCHHCHOCH$_2$). This analysis determined that the bottom liquid phase is essentially a siloxane oligomer. This siloxane oligomer contained essentially negligible amount of the phase transfer catalyst.

A GPC analysis determined that the epoxy functionalized oligomer had an average molecular weight of about 9489.

EXAMPLE 2

Two other oligomers were synthesized following the procedure of Example 1, except the reaction time, reaction temperature, and phase transfer catalyst were changed. Two epoxy siloxane oligomers were formed using the reaction conditions as shown in Table 1. The NMR analysis determined that the bottom liquid phases obtained in this example were essentially a siloxane oligomer. This siloxane oligomer contained essentially negligible amount of the phase transfer catalyst. The formed siloxane oligomers had weight average molecular weights as shown in Table 1.

TABLE 1

| | | Siloxane oligomers | | |
|---|---|---|---|---|
| Example | Reaction time | Reaction temperature | Phase Transfer Catalyst | Weight average molecular weight of oligomer |
| 2A | 2 hour | 60° C. | Tricaprylylmethylammonium chloride (ALIQUAT ® 336) | 8029 |
| 2B | 3 hour | 60° C. | Tetrabutylphosphonium bromide (TBPB) | 7738 |

EXAMPLE 3

A coating composition was prepared according to the following procedure. The following components were added to a reaction flask: 24 grams of the epoxy siloxane oligomer obtained in Example 1; 20 grams of a colloidal silica (about 31 weight percent silica, in propylene glycol monomethyl ether acetate, PM-ST, available from Nissan Chemicals, Japan); 16 grams of ethyl acetate; 16 grams of isopropanol; 0.36 grams of a thermal latent curing catalyst, ammonium antimonite (CDX1612, available from King Industries, Norwalk, Conn.). The components were mixed in the flask at 20° C. for 2 hours. The thermal latent curing catalyst ratio of this composition was about 1.5 and the particle ratio was about 25 percent. The solids content of this composition was 40 percent.

Flat PC plates (available from Mitsubishi, Japan) were coated using the coating composition prepared in this example. These plates were prepared according to the following procedure: first, the plates were ultrasonically washed for about 5 minutes in a first tank filled with a detergent solution (Triton X-100<1 wt % in water); second, the plates were rinsed with deionized water for about 1 minute; third, the plates were ultrasonically washed for about 5 minutes in a second tank filled with deionized water; and fourth, the plates were ultrasonically washed for about 7 minutes in a third tank filled with deionized water. After the final washing step, the plates were dried with an air gun.

The PC plates were then dip-coated in a tank filled with the abrasion resistant coating composition prepared in this example. The dip-coating was carried out using a withdrawal speed of about 0.25 cm/sec at a room relative humidity of about 50 percent. The plates were then heated in an oven at about 130° C. for about 30 minutes to cure the coating.

The coating on the PC plates were tested to determine its Bayer number by replacing the circular opening available for the testing of lenses with a 3 cm×3 cm square opening. The adhesion rating was Y1. Results of the tests for this coating are summarized in Table 2.

EXAMPLE 4

Twelve abrasion resistant coatings (4A-4L) were prepared and analyzed in the same manner as in Example 3, except that the amount of the siloxane oligomer, the amount of the colloidal silica used, and the coating thickness applied to the plate were varied. A summary of the properties of these samples, and the testing results, may be found in Table 2.

TABLE 2

Epoxy Functionalized Siloxane Oligomer Based Coating Compositions

| Example | Solid content (%) | Particle Ratio | Coating Thickness (micrometer) | Bayer Ratio |
|---|---|---|---|---|
| 3 | 40 | 25 | 1.9 | 0.6 |
| 4A | 20 | 25 | 2.0 | 0.2 |
| 4B | 50 | 25 | 3.6 | 1.3 |
| 4C | 30 | 25 | 1.6 | 0.3 |
| 4D | 30 | 32.5 | 1.1 | 0.3 |
| 4E | 40 | 10 | 2.0 | 0.6 |
| 4F | 40 | 17.5 | 2.1 | 0.7 |
| 4G | 40 | 25 | 2.3 | 0.8 |
| 4H | 30 | 17.5 | 1.6 | 0.3 |
| 4I | 40 | 32.5 | 2.1 | 1.0 |
| 4J | 40 | 40 | 2.1 | 0.9 |
| 4K | 50 | 17.5 | 3.9 | 1.3 |
| 4L | 60 | 25 | 10.0 | 2.0 |

The samples of Example 3 and Example 4 together demonstrated that the solid content, the particle ratio, and the coatings thickness had a combined effect on the Bayer ratio.

EXAMPLE 5

A coating composition was prepared according to the following procedure. The following components were added to a flask: 56 grams of the epoxy functionalized oligomer obtained in Example 2A; 75 grams of the colloidal silica PM-ST; 33 grams of 1-methoxy-2-propanol; 33 grams of isopropanol; 0.85 grams of the thermal latent curing catalyst ammonium antimonite (CDX1612). The components were mixed in a flask at about 20° C. for 2 hours. The thermal latent curing catalyst ratio of this composition was about 1.5 and the particle ratio was about 40. The solids content of the composition prepared in this example was about 40 percent.

The coating composition prepared above was deposited on uncoated PC Base 6 plano lenses (available from Oracle Lens Manufacturing Corporation, Warwick, Rhode Island). The lenses were prepared before coating by washing with isopropanol and then dried by wiping with a dry clean room cloth. After the cleaning step, the PC lenses were coated with the primer PR1133 by using a dip coating process with a withdrawal speed of about 0.25 cm/sec at a room relative humidity of about 50 percent. The primer was dried and cured in an oven at about 110° C. for about 15 minutes.

The primed PC lens was then dip coated in a tank filled with the abrasion resistant coating composition prepared in this example. The dip coating used a withdrawal speed of about 0.5 cm/sec, with room conditions of a room relative humidity of about 50 percent and an air temperature of about 20° C. After coating, the lens was then heated in an oven at about 130° C. for about 30 minutes to dry and cure the coating. The final coating had the properties as shown in Table 3.

EXAMPLE 6

A coating composition was prepared in the same manner as in Example 5 except the oligomer synthesized in Example 2B was used in the preparation. The coating was prepared and analyzed in the same manner as in Example 5. The final coating had the properties as shown in Table 3.

TABLE 3

Siloxane Oligomer Based Coating Compositions

| Example | Adhesion | Coating Thickness (micrometer) | Bayer Ratio |
|---|---|---|---|
| 5 | Y1 | 6.3 | 2.2 |
| 6 | Y1 | 5.9 | 2.2 |

EXAMPLE 7

350 grams of a colloidal silica (Nalco 1034A, about 34 weight percent aqueous colloidal silica solution, available from Nalco Company, Naperville, Ill.), 350 grams of isopropanol, and 26 grams of (3-glycidoxypropyl)dimethylethoxysilane were mixed in a flask and heated for about 1 hour under the refluxing temperature of the mixture. After the refluxing step, the mixture was concentrated to a total weight of about 376 grams by removing the volatile compounds through heating the mixture at a temperature of about 53° C. and at a pressure of about 100 mbar.

The liquid phase of the refluxed mixture was then replaced with isopropanol by conducting four repetitive solvent exchange steps. At each step, about 200 grams of isopropanol was added to the refluxed mixture and then the sample reduced to about 376 grams by heating the mixture at a temperature of about 53° C. and at a pressure of about 100 mbar. After four iterations, the mixture was cooled down to a temperature of about 20° C. and filtered through 5 micrometers pore size filter paper. This yielded a surface modified colloidal silica dispersion in isopropanol (about 30 wt %).

EXAMPLE 8

A coating composition was prepared according to the following procedure. 56 grams of the epoxy siloxane oligomer obtained in Example 2A, 75 grams of the surface modified colloidal silica dispersion obtained in Example 7, 60 grams of propylene glycol monomethyl ether acetate, 7 grams of isopropanol, and 0.85 grams of the thermal latent catalyst ammonium antimonite (CDX1612) were mixed in a flask at about 20° C. for 2 hours. The thermal latent curing catalyst ratio of this composition was about 1.5 and the particle ratio was about 40. The solids content of the composition prepared in this example was about 40 percent.

Uncoated PC Base 6 plano lenses (purchased from Oracle Lens Manufacturing Corporation) were used for testing. These lenses were prepared by being washed with isopropanol and then dried by wiping with a dry clean room cloth. After cleaning, the PC lenses were coated with the primer PR1133 by using a spin coater (WS-400-6NPP-LITE, available from Laurel Technologies Corporation, North Wales, Pa.) at a spin speed of about 2000 rpm and a spin time of about 20 seconds at a room relative humidity of about 50 percent. The primed lenses were then dried in an oven at about 110° C. for about 15 minutes.

The abrasion resistant coating composition prepared in this example was deposited on the primed PC lens by using the spin coater WS-400-6NPP-LITE at a spin speed of about 500 rpm and a spin time of about 20 seconds. The lens was then heated in an oven at about 130° C. for about 30 minutes to cure the coating. The coating was tested in the same manner as in Example 5, and the properties were as shown in Table 4.

EXAMPLE 9

A coating composition was prepared in the same manner as in Example 5. A primer coating was prepared on a PC lens in the same manner as in Example 8. The abrasion resistance composition was deposited on the primed PC lens by using the spin coater WS-400-6NPP-LITE at a spin speed of 700 rpm and a spin time of 20 seconds. The abrasion resistance coating was cured and analyzed in the same manner as in Example 8, and the properties were as shown in Table 4.

EXAMPLE 10

A coating composition was prepared in the same manner as in Example 8 except the oligomer synthesized in Example 2B was used during the preparation. An abrasion resistant coating was prepared and analyzed in the same manner as in Example 8, and the properties were as shown in Table 4.

EXAMPLE 11

A coating composition was prepared in the same manner as in Example 8. A primer was prepared on a PC lens in the same manner as in Example 8. The coating composition was deposited on the primed PC lens by using the spin coater WS-400-6NPP-LITE at a spin speed of about 500 rpm and a spin time of about 1 minute. The coating was then cured at about 130° C. for about 5 minutes using a heat gun. An abrasion resistant coating was prepared and analyzed in the same manner as in Example 8, and the properties were as shown in Table 4.

EXAMPLE 12

A coating composition was prepared by adding 23 grams of the epoxy functionalized oligomer obtained in Example 1, 40 grams of 1-methoxy-2-propanol, 20 grams of isopropanol, and 0.115 grams of a thermal latent curing catalyst ammonium antimonite (CDX1612) to a flask. The mixture was mixed at about 20° C. for about 2 hours. The thermal curing catalyst ratio of this composition was about 0.5 and the solids content of this position was about 28 percent.

Flat PMMA plates (Shinkolite A, available from Mitsubishi, Japan) were used in this example. These plates were prepared as follows: first, ultrasonically washed for about 5 minutes in a first tank filled with a detergent solution (Triton X-100, <1 wt % in water); second, rinsed with deionized water for about 1 minute; third, further ultrasonically washed for about 5 minutes in a second tank filled with deionized water; and fourth, ultrasonically washed for about 7 minutes in a third tank filled with deionized water. After the final washing step, the plates were dried with an air gun.

The clean PMMA plates were coated with the primer PR1133 to provide adhesion between the plate and the abrasion resistant coating. This liquid primer was deposited on the plates by using the dip coating process with a withdrawal speed of about 0.25 cm/sec and cured in an oven about 110° C. for about 15 minutes.

The primer coated PMMA plates was dip coated in a tank filled with the abrasion resistant coating composition synthesized in this example with a withdrawal speed of about 0.25 cm/sec at a room relative humidity of about 50 percent. The plates were then heated in an oven about 130° C. for about 30 minutes to cure the coating.

The abrasion resistant coating was tested following the test methods described earlier, except that for the Bayer test, the circular opening was replaced with an about 3 centimeters by about 3 centimeters square opening, with the plate placed under this opening for the testing. The properties were as shown in Table 4.

TABLE 4

Siloxane Oligomer Based Coating Compositions

| Example | Adhesion | Coating Thickness (micrometer) | Bayer Ratio |
|---|---|---|---|
| 8 | Y1 | 4.4 | 2.6 |
| 9 | Y1 | 3.2 | 2.1 |
| 10 | Y1 | 4.0 | 2.9 |
| 11 | Y1 | 4.0 | 2.0 |
| 12 | Y1 | 4.0 | 0.5 |

A number of embodiments of the invention have been described. Nevertheless, it will be understood that various modifications may be made without departing from the spirit and scope of the invention. Accordingly, other embodiments are within the scope of the following claims.

What is claimed is:

1. A process, comprising:
    forming a siloxane oligomer from a mixture comprising at least one alkoxysilane, at least one phase transfer catalyst, and water; and
    adding at least one latent curing catalyst comprising ammonium antimonite to the siloxane oligomer to form a coating composition.

2. The process of claim 1, wherein the alkoxysilane has a general structure represented by formula (I):

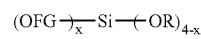

$$(OFG)_x-Si-(OR)_{4-x} \qquad I$$

wherein x equals 0, 1,2 or 3;
OR is a hydrolyzable alkoxy group;
R is an alkyl group; and
OFG is an organofunctional group.

3. The process of claim 2, wherein each R independently has from 1 to 20 carbon atoms.

4. The process of claim 2, wherein each R independently has from 1 to 4 carbon atoms.

5. The process of claim 2, wherein each OFG independently has from 1 to 100 carbon atoms.

6. The process of claim 2, wherein each OFG independently has from 1 to 20 carbon atoms.

7. The process of claim 2, wherein each OFO independently includes at least one functional group selected from the group consisting of epoxy, acrylate, methacrylate, amino, aectyl, cyano, halogen, mercapto, vinyl, alkoxyalkyl, carbamate, carboxyl, ester, aromatic, or alkyl (straight, branched, or cyclic) functional groups.

8. The process of claim 7, wherein each GPO has at least one carbon atom in addition to the at least one functional group.

9. The process of claim 1, wherein the at least one alkoxysilane is selected from the group consisting of (3-glyeidoxypropyl)trimethoxysilane, 2-(3,4-epoxycyclohexyl)ethyltrimethoxysilane, 2-(3,4-epoxycyelohexyl)ethyltriethoxysilane, 5,6-epoxyhexyltriethoxysilane, (3-methacryloxypropyl)trimethoxysilane, (3-methaeryloxypropyl)triethoxysilane, (3-acryloxypropyl) trimethoxysilane, tetraethoxysilane, tetramethoxysilane, 3-aminopropyltrimethoxysilane, 3-aminopropyltriethoxysilane, acetoxypropyltrimethoxysilane, 3-cyanopropyltrimethoxysilane, (3,3,3-trifluoropropyl)trimethoxysilane, (tridecafluoro-1,1,2,2-tetrahydrooetyl)triethoxysilane, 3-mercaptopropyltrimethoxysilane, vinyltrimethoxysilane, vinyltriethoxysilane, and mixtures thereof.

10. The process of claim 1, wherein the at least one alkoxysilane is selected from the group consisting of (3-glyeidoxypropyl)trimethoxysilane, 2-(3,4-epoxycyclohexyl)ethyltrimethoxysilane, 2-(3,4-epoxycyclohexyl)cthyltriethoxysilane, 5,6-epoxyhexyltriethoxysilane, (3-methacryloxypropyl)trimethoxysilane, (3-methacryloxypropyl)triethoxysilane, (3-acryloxypropyl) trimethoxysilane and mixtures thereof.

11. The process of claim 1, wherein the at least one alkoxysilane is selected from the group consisting of (3-glycidoxypropyl)trimethoxysilane, (3-methacryloxypropyl)trimethoxysilane, (3-methacryloxypropyl)tri ethoxysilane, and mixtures thereof.

12. The process of claim 1, wherein the at least one phase transfer catalyst is present in the mixture in an amount from about 0.0005 grams per gram of the alkoxysilane to 0.2 grams per gram of the alkoxysilane.

13. The process of claim 1, wherein the at least one phase transfer catalyst is present in the mixture in an amount from about 0.00 1 grams per mole of the alkoxysilane to 0.2 grams per gram of the alkoxysilane.

14. The process of claim 1, wherein water is present in the mixture in an amount from about 0.5 moles per mole of the alkoxysilane to 20 moles per mole of the alkoxysilane.

15. The process of claim 1, wherein water is present in the mixture in an amount from about 0.5 moles per mole of the alkoxysilane to 5 moles per mole of the alkoxysilane.

16. The process of claim 1, wherein the mixture further comprises a solvent.

17. The process of claim 16, wherein the solvent is selected from the group consisting of ethanol, isopropanol, 1-methoxy-2-propanol, ethyl acetate, n-butylacetate, t-butylacetate, 2-propoxyethanol, propylene glycol monomethyl ether acetate, and mixtures thereof.

18. The process of claim 16, wherein the solvent comprises isopropanol.

19. The process of claim 16, wherein the solvent is present in the mixture in an amount at least about 0.01 moles per mole of the alkoxysilane.

20. The process of claim 16, wherein the solvent is present in the mixture in an amount at least about 0.1 moles per mole of the alkoxysilane.

21. The process of claim 16, wherein the solvent is present in the mixture in an amount at least about 1 mole per mole of the alkoxysilane.

22. The process of claim 1, wherein forming a siloxane oligomer continues for a period sufficient to hydrolyze at least 40 percent of all OR groups.

23. The process of claim 1, wherein forming a siloxane oligomer continues for a period sufficient to hydrolyze at least 70 percent of all OR groups.

24. The process of claim 1, wherein forming a siloxane oligomer continues for a period sufficient to hydrolyze at least 80 percent of all OR groups.

25. The process of claim 1, wherein forming a siloxane oligomer continues for a period sufficient to form a siloxane oligomer with a weight average molecular weight from about 500 to about 100,000.

26. The process of claim 1, wherein forming a siloxane oligomer continues for a period sufficient to form a siloxane oligomer with a weight average molecular weight from about 1,000 to about 50,000.

27. The process of claim 1, wherein forming a siloxane oligomer continues for a period sufficient to form a siloxane oligomer with a weight average molecular weight from about 2,000 to about 20,000.

28. The process of claim 1, wherein the coating composition has a latent curing catalyst ratio from about 0.1 to about 5.0.

29. The process of claim 1, wherein the coating composition has a latent curing catalyst ratio from about 1.0 to about 3.0.

30. The process of claim 1, further comprising adding at least one solvent to the coating composition.

31. The process of claim 30, wherein the at least one solvent is selected from the group consisting of ethanol, isopropanol, 1-methoxy-2-propanol, ethyl acetate, n-butylaeetate, t-butylacetate, 2-propoxyethanol, propylene glycol monomethyl ether acetate, and mixtures thereof.

32. The process of claim 1, further comprising adding metal oxide particles to the coating composition.

33. The process of claim 32, wherein the metal oxide particles are selected from the group consisting of particles of silica, zirconium oxide, zinc oxide, titanium oxide, aluminum oxide, cerium oxide, tin oxide, Atrium oxide, antimony pentoxide, silica-titania, indium tin oxide, antimony tin oxide, and mixtures thereof.

34. The process of claim 32, wherein the metal oxide particles have functional groups on their surfaces.

35. The process of claim 32, wherein the coating composition has a particle ratio from about 0.1 to about 200.

36. The process of claim 32, wherein the coating composition has a particle ratio from about 20 to about 100.

37. The process of claim 32, wherein the coating composition has a particle ratio from about 30 to about 70.

38. The process of claim 1, wherein the coating composition has a solid content from about 20% to about 60%.

39. The process of claim 1, wherein the coating composition has a solid content from about 30% to about 50%.

40. The process of claim 1, wherein the coating composition has a viscosity from about 1 centipoise to about 150 centipoises.

41. The process of claim 1, wherein the coating composition has a viscosity from about 2 centipoises to about 30 centipoises.

42. The process of claim 1, wherein the coating composition has a viscosity from about 3 centipoises to about 10 centipoises.

43. The process of claim 1, further comprising:
applying the coating composition to an article to form a coated article.

44. The process of claim 43, further comprising preparing the surface of the article prior to applying the coating composition.

45. The process of claim 44, wherein preparing the surface comprises applying a primer layer to the surface of the article.

46. The process of claim 1, further comprising purifying the formed siloxane oligomer before forming the coating composition.

47. The process of claim 46, wherein purifying the formed siloxane oligomer comprises separating a first liquid phase from a second liquid phase.

48. The process of claim 1, wherein adding at least one latent curing catalyst comprises adding the at least one latent curing catalyst without separating the phase transfer catalyst from the siloxane oligomer.

49. The process of claim 1, wherein adding at least one latent curing catalyst comprises adding the at least one latent curing catalyst afier separating the phase transfer catalyst from the siloxane oligomer.

* * * * *

UNITED STATES PATENT AND TRADEMARK OFFICE
CERTIFICATE OF CORRECTION

PATENT NO. : 7,329,715 B2 Page 1 of 1
APPLICATION NO. : 11/108175
DATED : February 12, 2008
INVENTOR(S) : Hailiang Wang, Zhibang Jim Duan and Satyabrata Raychaudhuri It is certified that error appears in the above-identified patent and that said Letters Patent is hereby corrected as shown below:

Column 26, line 26, please delete "coaling" and insert --coating-- therefor;

Column 26, line 45, please delete "OFO" and insert --OFG-- therefor;

Column 26, line 48, please delete "aectyl" and insert --acetyl-- therefor;

Column 26, line 51, please delete "GPO" and insert --OFG-- therefor;

Column 26, line 57, please delete "epoxycyelohexyl" and insert --epoxycyclohexyl--therefor;

Column 26, lines 59-60, please delete "methaeryloxypropyl" and insert --methacryloxypropyl-- therefor;

Column 26, line 65, please delete "tetrahydrooetyl" and insert --tetrahydrooctyl--therefor;

Column 28, lines 11-12, please delete "butylaeetate" and insert --butylacetate-- therefor;

Column 28, line 19, please delete "Atrium" and insert --yttrium-- therefor;

Column 28, line 64, please delete "afier" and insert --after-- therefor.

Signed and Sealed this

Nineteenth Day of August, 2008

JON W. DUDAS
*Director of the United States Patent and Trademark Office*